March 23, 1965  A. U. WELCH  3,175,173
SHIELDED ELECTRICAL INDUCTION APPARATUS
Filed June 12, 1961  2 Sheets-Sheet 1

Inventor,
Alanson U. Welch,
by Gilbert P. Tarleton
His Attorney.

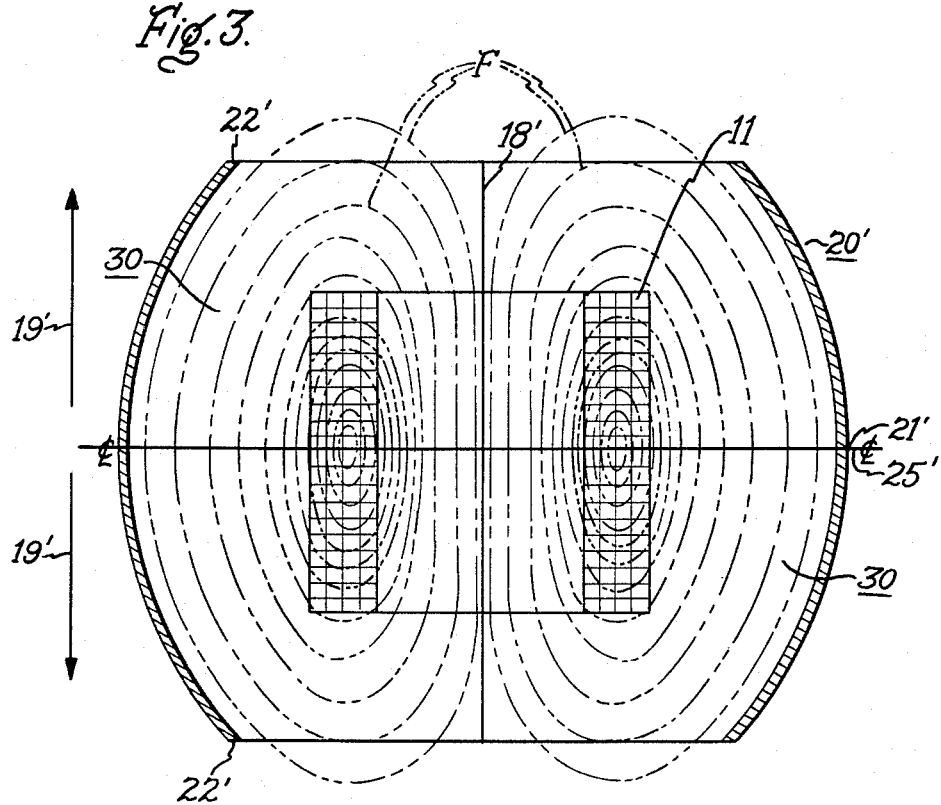

United States Patent Office

3,175,173
Patented Mar. 23, 1965

3,175,173
SHIELDED ELECTRICAL INDUCTION APPARATUS
Alanson U. Welch, Pittsfield, Mass., assignor to General Electric Company, a corporation of New York
Filed June 12, 1961, Ser. No. 116,402
6 Claims. (Cl. 336—84)

This invention relates to means for reducing the audible noise generated during normal operation by electrical apparatus, and more specifically to noise reducing arrangements for electrical induction apparatus of the type having a flux producing member contained in a metallic enclosure.

Large electrical induction apparatus such as power transformers, reactors, and the like, inherently produce audible frequency vibrations during normal operation. When such apparatus is housed in a metallic enclosure, the vibrations transmitted to the enclosure are in turn transmitted to the surrounding atmosphere as audible noise; the noise is frequently the source of complaint when the apparatus is positioned in locations having a relatively low noise level.

Two basic approaches for reducing the amount of noise transmitted by such apparatus are: first, to improve the construction of the apparatus so that the amount of vibration is decreased; and second, to interpose barriers or vibration dampening means between the apparatus and the atmosphere surrounding it. Numerous expedients have been proposed by the prior art in accord with the above approaches. These include reducing vibrations by operating the apparatus at relatively low flux density levels in order to decrease magnetstrictive effects in magnetic core materials; and dampening vibrations by supporting the apparatus on resilient mountings, and interposing various types of vibration absorbing barriers between vibrating members and the metallic enclosure. In general, the arrangements proposed by the prior art are relatively expensive, and there are some apparatus arrangements for which no satisfactory solution has been devised.

More specifically, the problem of noise suppression is particularly acute in large coreless reactors; these devices are employed in alternating current electrical power generation and distribution systems for limiting current during surges or for balancing the capacitance of the power distribution lines. Reactors are often several feet in height and diameter and are operated at high energy or power levels; consequently, they have large metal surfaces that are driven into vibration by the power flowing through them so as to produce audible noise of disturbing quantities. Therefore, I have chosen an embodiment of this type of apparatus for illustrating and explaining my invention. It is to be understood, however, that the principles of my invention may be employed with other types of electrical apparatus.

Coreless power reactors are an extreme example of electrical induction apparatus in which the flux tends to fringe outwardly to the extent that it causes large eddy current losses and dangerous heating in the magnetic metal enclosures employed to contain the apparatus; consequently, flux-confining eddy current shields are often employed. The first aspect of my invention is directed to improvements in that type of shield. The prior art shields usually had the shape of right circular cylinders, which were positioned coaxially with the windings of the reactor. Eddy current shields are made from highly conductive metals such as copper and aluminum, and these metals are relatively flexible. The interaction of the magnetic field with the eddy currents in the shield produces varying amounts of stress at different locations in the shield. These stresses cause the shield to expand and contact at various locations, thus producing a large amount of vibration.

In coreless reactors a very high proportion of the noise generated by the apparatus is caused by the vibration of the eddy current shield. The reason for this is that although the prior art shields were theoretically right circular cylinders, as a practical matter, manufacturing tolerances permit the shield to be slightly out of round. Assuming that the eccentricity of the shield causes it to approach an elliptical shape, it can be shown mathematically that for a ½-inch thick shield having a 50-inch radius that is about 0.2-inch out of round, the vibration is 72 times greater than that which would occur with a truly circular shield.

Therefore, an object of my invention is to provide an improved eddy current shield that does not produce as much vibration as prior art shields.

Another object of the invention is to proivde an improved eddy current shield that has increased stiffness by virtue of its shape.

A further object of the invention is to provide an eddy current shield that has an improved flux confining effect because of its shape in addition to having increased stiffness for the same reason.

A still further object of the invention is to provide improved electrical induction apparatus that produces fewer audible frequency vibrations.

A further object of the invention is to provide a quieter coreless reactor of the type requiring an eddy current shield located coaxially with its windings.

Briefly stated, according to the above aspect of my invention, a tubular eddy current shield interposed between a flux producing member and a magnetic metal container enclosing the member may have its stiffness increased and its flux confining effects increased by locating the center portion of the shield farther away from the flux-producing member than the ends of the shield.

It is apparent that the above-described aspect of my invention is directed to reducing the amount of vibration originating in electrical induction apparatus. The second aspect of my invention is directed to the dampening or blocking of vibrations before they reach the metallic enclosure containing the apparatus. One type of previously employed expedient for dampening vibrations produced by electrical induction apparatus was to interpose a gas (e.g., air) cell between the vibrating parts of the apparatus and the metallic enclosure. Various arrangements of this type have been proposed, some of which include employing the exterior wall of the enclosure as one wall of the gas cell and a relatively thin metallic member located inside of the enclosure as the other wall of the gas cell. When the apparatus was insulated and cooled by a dielectric liquid, the prior art arrangements required that the gas cell be under increased internal pressure or that it be partially filled with solid material in order to prevent crushing of its thin wall under the weight of the dielectric liquid. The above type of arrangement is disclosed in United States Letters Patent 1,846,887. The prior art arrangements were relatively expensive, and also had the disadvantage that the solid material provided a path for transmission of vibrations directly to the exterior of the enclosure.

Therefore, an object of my invention is to provide an improved arrangement for dampening the transmission of sound from a vibrating member in electrical apparatus to the exterior of an enclosure containing the apparatus.

Another object of the invention is to provide a gas cell for dampening the transmission of sound produced by electrical apparatus in which the gas cell is entirely free from solid or liquid materials.

A further object of the invention is to provide a gas cell for dampening the transmission of sound produced by electrical apparatus in which a relatively thin member defining a wall of the cell has unrestricted freedom of movement at one of its ends.

Another object of the invention is to provide a gas cell for dampening noise radiated by electrical apparatus in which the cell has increased strength by virtue of its shape.

A further object of the invention is to provide a circular enclosure for electrical apparatus in which an exterior wall of the enclosure serves as one member of a noise dampening air cell.

A still further object of the invention is to provide quieter electrical apparatus which takes advantage of its circular configuration to dampen vibrations.

Briefly stated, according to this aspect of the invention, a sound dampening air cell for electrical apparatus which is defined by an exterior wall of a metallic enclosure for the apparatus and a thin-walled flexible barrier closely adjacent the enclosure wall may be improved by entirely eliminating solid or liquid material from the gas space, when the flexible barrier is circular in cross-sectional configuration.

Other objects and advantages of the invention will be apparent from the detailed description, drawing, and claims which follow, and the scope of the invention will be pointed out in the claims.

In the drawing:

FIGURE 3 is a simplified, schematic enlarged cross-sectional view showing the relationship between the lines of flux produced by an electrical coil and an eddy current shield in accord with my teachings.

Figure 1:
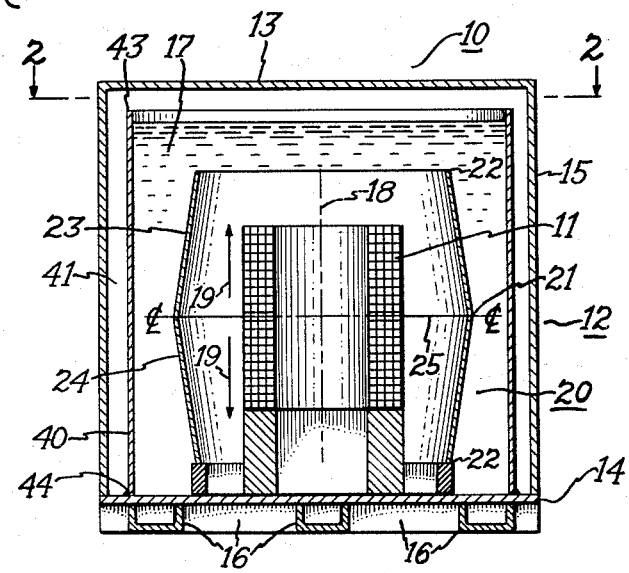
FIGURE 1 is a schematic, vertical cross-sectional view of a coreless reactor in accord with the teachings of my invention.
Figure 2:
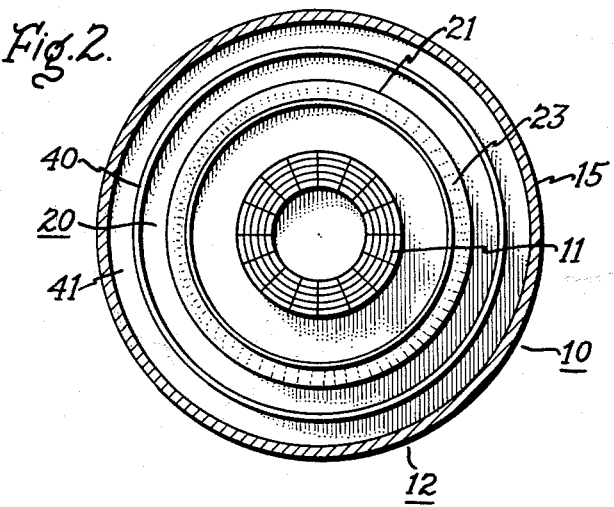
FIGURE 2 is a cross-sectional plan view taken along the line 2—2 in FIGURE 1.

Referring now to FIGURES 1 and 2, therein is illustrated a coreless electrical reactor 10 comprising flux-producing reactor windings 11 made from coiled lengths of insulated conducting material. The structure of such coils and the manner of connecting them to other apparatus are well known in the art, so these details have been omitted. Also, conventionally employed accessories, such as bushings, and heat exchangers with their liquid circulating systems, which form no part of the present invention, have not been illustrated or described.

The coil 11 is contained in a relatively thick walled housing enclosure 12 made from magnetic metal such as steel. The enclosure 12 has a top 13, a bottom 14, and a side wall 15 that is shaped like a right circular cylinder. The bottom 14 is supported by and re-enforced with structurally rigid beams 16. The windings 11 may be supported in any desired manner on the bottom 14. The enclosure is partially filled with an insulating and cooling liquid 17, such as high dielectric strength askarel, in which the drawings 11 are immersed.

A tubular eddy current shield 20 made from highly conductive metal such as copper or aluminum is interposed between the windings 11 and the enclosure 12, with the relationship between the windings and shield being such that the longitudinal centroidal axis 18 of the shield and windings coincide. The shield may be supported in any desired manner on the bottom 14. An eddy current shield in accord with my teachings has a center portion 21 that is located farther away from the windings 11 than the ends 22 of the shield. In the embodiment illustrated in FIGS. 1 and 2, the shield 20 has the configuration of two right circular cones 23 and 24 having a common base aligned with the horizontal center line 25 of the shield, and having their pointed ends truncated at 22 to form an open-ended structure. Thus, the center portion 21 of the shield is farthest from the windings 11, the ends 22 of the shield are closest to the windings 11, and the portions of the shield above and below its center portion 21 gradually and symmetrically become closer to the winding moving in the directions of the arrows 19 away from the center of the shield.

Another embodiment is shown in FIG. 3, wherein the open-ended tubular shield 20' has the configuration of a sphere with its top and bottom caps or poles truncated at uniform distances above and below the horizontal center line 25' of the coil 11, which coincides with the center line of the shield. Thus, the center portion 21' of the shield 20' is farthest from the windings 11, the ends 22' are closest to the windings 11, and the remaining portions of the shield above and below its center curve closer to the winding, moving in the directions of the arrows 19' away from its center.

In any embodiment in accord with my teachings, the eddy current shield should be symmetrically located with respect to the flux-producing member it surrounds, and the center lines of the shield and flux-producing member should coincide. Thus, the line of intersection between the surface of a shield and any plane perpendicular to its longitudinal centroidal axis will define a circle. The circle defined by a perpendicular plane passing through the mid-point of the longitudinal centroidal axis will have the largest diameter, as at 21 in FIG. 1 and 21' in FIG. 3; the circles defined by similar planes intersecting the ends of the shield will have the smallest diameters, as at 22 in FIG. 1 and 22' in FIG. 3; and the circles defined by similar planes intersecting the remaining portions of the shield will gradually decrease in diameter moving in the directions of the arrows 19 and 19' away from the plane that passes through the mid-point.

It follows that a shield in accord with my teachings may have shapes other than those shown in the drawing, such as barrel, spheroidal, or elliptical, so long as the above-described relationships between the shield and flux-producing member are present. It is to be understood that the geometrical shapes described are the theoretically perfect shapes sought, but that deviations from perfect geometrical shapes in accord with practical manufacturing tolerances will be found in commercially produced apparatus.

Magnetic flux from the winding 11 is prevented from reaching the enclosure 12 because it is confined by the shield 20, where the flux produces eddy currents. As is well known in the art, the interaction between the flux and the eddy currents causes stresses in the shield that cause it to deflect or vibrate radially at audible frequencies. A shield in accord with my teachings is considerably stiffer under the stress conditions encountered because portions of the shield are located farther away from its axis of bending, and the resistance of the shield to flexure is a function of the square of its distance from that axis. For example, it can be shown mathematically that a double conical shield as shown in FIGS. 1 and 2 having a wall thickness of ½-inch, a total height of 70 inches, a maximum radius at its center of 58 inches, and a minimum radius at its ends of 54 inches, is theoretically sixty-four times stiffer than a right circular cylindrical shield of the same thickness and height having a 58-inch radius. Thus by locating the ends of the shield closer to the winding than the center of the shield, the stiffness of the shield is greatly increased. Although spherical shields of the type illustrated in FIG. 3 would be stiffer than the double conical shield of FIGS. 1 and 2, the embodiment of FIGS. 1 and 2 is preferred for commercial apparatus because of the greater expense and manufacturing difficulties involved in producing spherical and spheroidal shapes. It has been found that for a commercially produced reactor having a power rating of 26 megavolt-amperes, computations and comparative tests of other reactors having cylindrical shields indicate that the use of a shield of the configuration shown in FIGS. 1 and 2 reduced the sound level about 10 decibels, with the final sound level being about 60 decibels.

Eddy current shields in accord with my teachings are not only much more rigid but also have increased flux confining capacity, when compared to prior art shields. This can be illustrated by reference to FIGURE 3 where the lines F represent lines of magnetic flux produced by the windings 11. It should be noted that the flux lines F tend to curve outwardly in the areas generally designated 30 so that they roughly parallel the inside of the shield 20'. The result is that a larger number of flux lines are confined within the shield 20' without actually cutting through the shield than would be the case if the shield were a right circular cylinder. To a somewhat lesser extent, the same effect is achieved with the double conical shield 20 of FIGS. 1 and 2. A shield having its center portion spaced the greatest distance away from the winding 11 in accord with my teachings has a greater flux confining effect for still another reason; more lines of flux are confined within the shield because the flux lines are greater in number in the horizontal plane passing through the center line of the winding 11, since there is more leakage flux at the center of the winding. It is, therefore, apparent that eddy current losses are reduced in a shield in accord with my teachings.

Returning to FIGURES 1 and 2, another aspect of my invention concerns improvements in a gas cell for preventing the transmission of noise from a vibrating member of electrical apparatus, such as the shield 20, to a container for the apparatus, such as the enclosure 12, through the liquid 17. In the illustrated embodiment, this is accomplished by placing a relatively thin sheet of metal 40 such as steel closely adjacent the wall 13, so as to provide a relatively flexible barrier for absorbing energy from sound waves. Thus the enclosure wall 15 and flexible barrier 40 define a gas space 41 therebetween. The gas occupying the space 41 can be air, nitrogen, or a high strength dielectric gas such as sulphur hexafluoride ($SF_6$) can be used, so long as it is compatible with the dielectric liquid 17. Since gas is a poorer medium for transmitting vibrations than are liquids and solids, the number of vibrations produced by the apparatus that eventually reaches the enclosure 12 is reduced.

Generally speaking, the above-described type of double-walled enclosure is well known in the prior art. However, I have discovered that when the enclosure 12 is circular in cross-section, it is unnecessary for the gas space 41 to be occupied by any solid or liquid material for supporting the relatively thin barrier 40 from crushing under the weight of the liquid 17. The reason is that the liquid 17 produces essentially only hoop stresses in the barrier 40. Therefore, the circular barrier 40 is not as subject to crushing as it would be if it had straight line or substantially non-circular side walls. For the same reason, the gas space need not be at an elevated pressure for the purpose of supporting the barrier 40; the barrier 40 will be sufficiently resistant to collapse that the gas space 41 can be under a partial vacuum.

Another feature of the invention concerns the upper end 43 of the barrier 40, which is not attached to the enclosure wall 15. This permits the barrier 40 to move more freely upon the impact of sound or vibration waves, and this tends to increase its sound absorbing qualities. The lower end 44 of the barrier 40 may be joined in any desired manner to the bottom 14 of the enclosure 12. The bottom 14 is relatively rigid because it is attached to the rigid reenforcing members 16. Thus, the wall 15 and barrier 40 are connected at a location where the least amount of vibration can be transmitted directly from one to the other.

As is apparent from the above description, the barrier 40 defines on its inside a receptacle for containing the liquid 17. Therefore, the barrier 40 must extend above the windings 11 a distance sufficient to permit expansion and contraction of the liquid 17 during temperature changes with the windings 11 always being completely immersed.

It has thus been shown that by practicing one aspect of my invention, an eddy current shield can be constructed so that it produces fewer vibrations and also has increased flux confining capacity. This reduces the number of vibrations originated in electrical induction apparatus. Another aspect of my invention is concerned with dampening the vibrations of electrical apparatus by confining them in an improved gas cushion before they can be radiated as audible sound. It has been shown that a gas cushion formed from one member which is relatively flexible can be improved by the elimination of solid material for supporting the relatively flexible member when it is circular in cross-section. Although both of the above-described aspects of my invention have been illustrated as cooperating arrangements in a coreless electrical reactor, it will be apparent to those skilled in the art that they may be used independently of each other in diverse types of electrical apparatus.

It will be understood, of course, that while the forms of the invention herein shown and described constitute preferred embodiments, it is not intended herein to illustrate all of the equivalent forms of ramifications thereof. For example, an eddy current shield in accord with my teachings can be employed with the so-called dry-type or air-core reactors, as well as with the liquid-immersed type illustrated in the drawing. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. A coreless electric reactor comprising a coil mounted substantially centrally within a housing of magnetizable material, a body of insulating liquid within said housing and immersing said coil, and an integral tubular eddy current shield of low resistance electrically conductive material surrounding said coil in coaxial relation therewith and disposed in said liquid between said coil and said housing, said shield being disposed about said coil in axially symmetrical relation and having a circular cross-sectional configuration in all axially transverse planes with its cross-sectional diameter diminishing symmetrically from a maximum at its axial midpoint to a minimum at its axially remote ends.

2. In combination: electrical induction apparatus having a magnetic flux-producing member enclosed in a magnetic metal container, and a metallic eddy current shield interposed between said container and said member, said shield surrounding said member and being symmetrically located with respect thereto, the line of intersection between the surface of said shield and any plane perpendicular to the longitudinal centroidal axis of the shield defining a circle, the circle defined by such a plane that passes through the mid-point of said axis having the largest diameter, the circles defined by similar planes intersecting the ends of said shield having the smallest diameters, and the circles defined by similar planes intersecting the remaining portions of said shield gradually decreasing in diameter in the directions moving away from said plane passing through the mid-point of said axis.

3. In combination: electrical induction apparatus having a magnetic flux-producing member enclosed in a magnetic metal container, and a metallic eddy current shield interposed between said container and said member, said shield surrounding said member and being symmetrically located with respect thereto; said shield having the geometrical configuration of two truncated cones having a common base, and said common base being aligned with the center of said flux-producing member so that the center of said shield is farther away from said flux-producing member than its ends.

4. In combination: electrical induction apparatus having a magnetic flux-producing member enclosed in a magnetic metal container, and a metallic eddy current shield interposed between said container and said member, said shield surrounding said member and being symmetrically located with respect thereto; said shield having the geometrical configuration of a sphere truncated at opposite poles so as to open-ended, and said sphere being oriented so that the center portion of said shield is farthest away from said flux-producing member.

5. A coreless electric reactor comprising a substantially cylindrical winding mounted coaxially within a rigid cylindrical housing of magnetizable material having an end wall forming a rigid bottom portion, a flexible cylindrical metallic barrier coaxially disposed within said housing closely adjacent and spaced from the sidewalls thereof to define therebetween a cylindrical gas space, said barrier being fixedly attached at one end to said rigid bottom portion of said housing and forming with said bottom a free-standing fluid-tight container open and free of rigid connection at its top, a body of insulating liquid within said housing confined entirely within said container, and a tubular eddy current shield of low resistance electrically conductive material within said liquid and coaxially surrounding said winding and extending beyond the ends thereof.

6. Electrical induction apparatus of the type having a magnetic flux and vibration producing member enclosed in a relatively thick-walled magnetic metal container and immersed in a high strength dielectric liquid within the container, a metallic eddy current shield interposed between said container and said member, and a relatively thin-walled flexible barrier interposed closely adjacent said container between said member and container so as to define with said container a gas space between the container and liquid that reduces vibrations transmitted from said member to said container by said liquid, a center portion of said eddy current shield being farther away from said flux-producing member than its ends, the remaining portions of the shield gradually and symmetrically becoming closer to said flux-producing member in the directions moving away from the center of the shield, said gas space being entirely devoid of supporting solid or liquid material between said barrier and said container, and said barrier being circular in cross-sectional configuration.

References Cited by the Examiner

UNITED STATES PATENTS

| | | | |
|---|---|---|---|
| 1,709,054 | 4/29 | Bennett | 336—84 |
| 2,555,511 | 6/51 | Sands | 336—84 X |
| 2,734,096 | 2/56 | Ennis | 336—100 X |

FOREIGN PATENTS 73,638 11/16 Switzerland.

JOHN F. BURNS, *Primary Examiner*.